United States Patent [19]

Lin

[11] Patent Number: 5,300,139
[45] Date of Patent: Apr. 5, 1994

[54] AIR CLEANER WITH A BUILD-IN ASHTRAY

[76] Inventor: Shih-Chiang Lin, No. 106, Tung-Ho West Street Sec. 2, Shih Lin, Taipei, Taiwan

[21] Appl. No.: 120,250

[22] Filed: Sep. 13, 1993

[51] Int. Cl.$^5$ .................... B01D 53/04; A24F 19/10
[52] U.S. Cl. ........................................ 96/135; 55/279; 55/385.8; 55/467; 96/147; 131/231; 131/240.1; 131/242
[58] Field of Search ............... 55/279, 385.8, 467; 96/132, 134, 135, 147, 154; 131/231, 238, 240.1, 242

[56] References Cited

U.S. PATENT DOCUMENTS

| | | | |
|---|---|---|---|
| 3,966,442 | 6/1976 | Waters | 96/132 |
| 4,052,179 | 10/1977 | Kirk | 131/242 X |
| 4,119,419 | 10/1978 | Passayo et al. | 55/385.8 X |
| 4,553,992 | 11/1985 | Boissinot et al. | 96/135 |
| 4,671,300 | 6/1987 | Grube et al. | 131/231 |
| 5,259,400 | 11/1993 | Bruno et al. | 131/238 |

Primary Examiner—Charles Hart
Attorney, Agent, or Firm—Shih-Chiang Lin

[57] ABSTRACT

An improved, air cleaner is provided to eliminate the detriment caused by air pollution and cigarette smoke. The air cleaner includes a removable build-in ashtray which is mounted in front of the housing of the air cleaner. At smoking, the ashtray would be opened by removing its cover. When the ashtray is full of ash, it would be removed for emptying and cleaning. The air cleaner is provided with a disposable filter pack inserted into an open slot of the cleaner housing. The filter pack contains an active carbon layer and chemical catalyst and perfume therein.

3 Claims, 2 Drawing Sheets

AIR CLEANER WITH A BUILD-IN ASHTRAY

BACKGROUND OF THE INVENTION

The present invention relates to an improved air cleaner, and more particularly to an air cleaner with a build-in ashtray. The ashtray is removable from the air cleaner, and a disposable filter may be inserted between the air cleaner and the ashtray for refreshing air.

Many people in Taiwan die of liver cancer each year. Liver cancer has ranked the first and second place respectively in female and male ten main death causes. Undoubtedly, air pollution and cigarette smoke cause liver cancer and should be eliminated.

The well-known air cleaner or air refresher is merely a simple refresh device for refreshing air. Typically, the air cleaner have to be placed in a closed space, such as a room or car. It is found that visible vapor with particles of carbon normally so called secondhand smoke, coming from a burning cigarette, is quite a bother to most people. However, the well-known air cleaner is not effective to eliminate the cigarette smoke when it is used in a smoking environment.

SUMMARY OF THE INVENTION

Consequently, the primary object of the present invention is to provide an improved air cleaner capable of refreshing air in order to eliminate the detriment caused by air pollution and secondhand smoke. The present invention is suitable for use in family, office, car, and so on.

The other object of the present invention is to provide an air cleaner with a removable build-in ashtray. The removable covered ashtray is installed in front of the housing of the air cleaner. This invention acts as an air cleaner both at usual time and smoking. At smoking, the ashtray would be opened by removing its cover. When the ashtray is full of ash, it would be removed for emptying and cleaning.

The another object of the present invention is to provide an effective air cleaner with a disposable filter pack.

The disposable filter pack comprises a rectangular carton with numerous air holes on two sides, and the outermost layer of carton is active carbon, in which chemical catalyst and perfume are contained. The whole pack is sealed and pressed into form. Used and expired pack may be disposed and replaced with a new one when it is no longer effective.

The present invention will become more apparent form the following description taken in connection with the accompanying drawings, wherein:

DETAILED DESCRIPTION OF THE INVENTION

The air cleaner with a build-in ashtray in accordance with the present invention is suitable for use in family, office or car. Alternative or direct electrical power source may be fused according to requirement.

Figure 1:
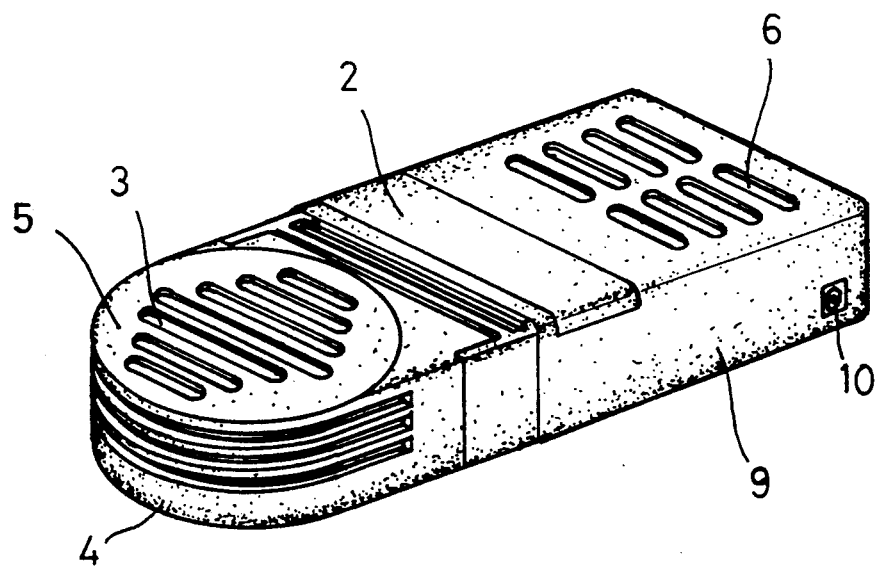
FIG. 1 is a perspective view of the air cleaner in accordance with the preferred embodiment of the present invention.

Referring to FIG. 1 now, it shows a perspective view of the air cleaner of the present invention. The improved air cleaner mainly consists of an air filter 1, a filter mounting frame 2, a cover 4, a removable covered ashtray 5, and a cleaner housing 9. The exploded perspective view of these parts is illustrated in FIG. 2, showing that the covered ashtray 5 is removed from the front end of the cleaner housing 9 and the air filter 1 and filter mounting frame 2 are extracted from the cleaner housing 9.

Figure 2:
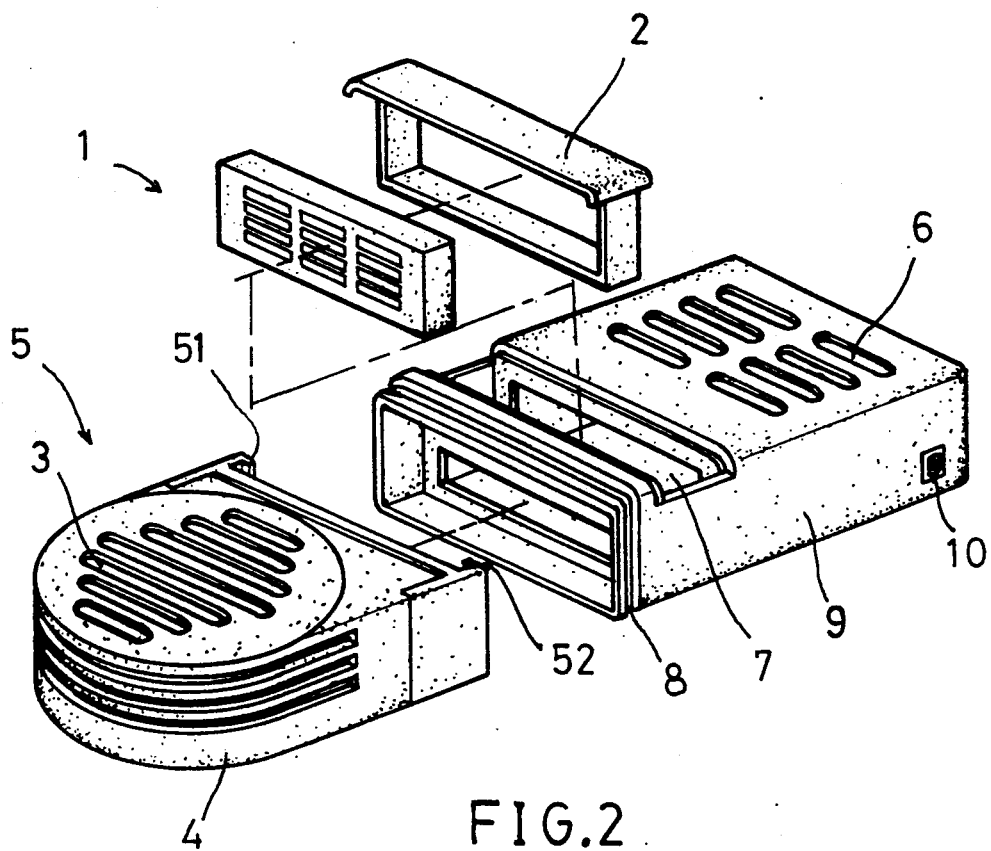
FIG. 2 is an exploded perspective view of the air cleaner as shown in FIG. 1.

As shown in FIG. 2, the cleaner housing 9 has an open end formed in front of the housing 9, acting as an air inlet of the cleaner. The removable covered ashtray 5 is mounted in front of the open end of the air cleaner housing 9.

In a preferred embodiment of the present invention, for associating the cleaner housing 9 with the removable ashtray 5 in a form of removable structure, two corresponding L-shaped wings 51 and 52 are formed on the rear wall of the removable ashtray 5, while a surrounding U-shaped slot 8 is formed on the open end of the cleaner housing 9. So, the removable ashtray 5 may be attached to the open end of the cleaner housing 9 by vertically sliding the ashtray 5 to the U-shaped slot 8. After installation, the L-shaped wings 51 and 52 of the removable ashtray 5 tightly hook the U-shaped slot 8 of the cleaner housing 9.

On the top plate of the cleaner housing 9, there is provided with a plurality of rectangular holes serving as an air outlet 6 of the cleaner housing 9. In the inner space of the cleaner housing 9, there is mounted a fan 11 under the position of the air outlet 6, with reference to FIG. 3. By the Action of the fan, an air flow may be blown from the open end of the cleaner housing to the air outlet 6.

The fan 11 may be powered by a DC power source which may be inputted by way of a jack 10 mounted on a side wall of the cleaner housing 9. In alternative, the present invention may be powered by a build-in battery (not shown).

Figure 4:
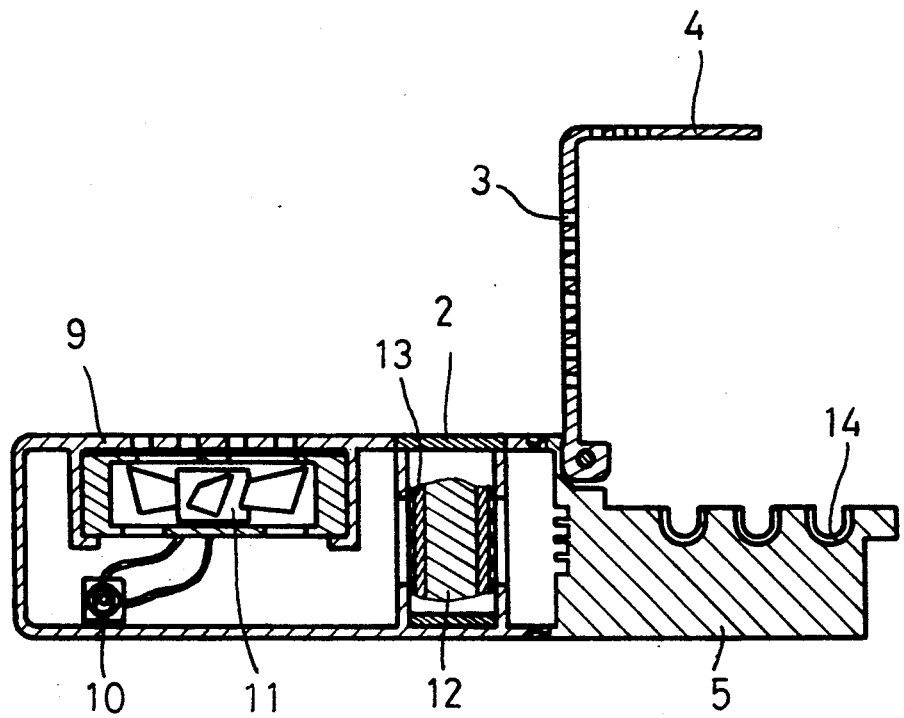
FIG. 4 is a sectional view of the air cleaner of the present invention, showing that the cover of the ashtray is removed.
Figure 3:
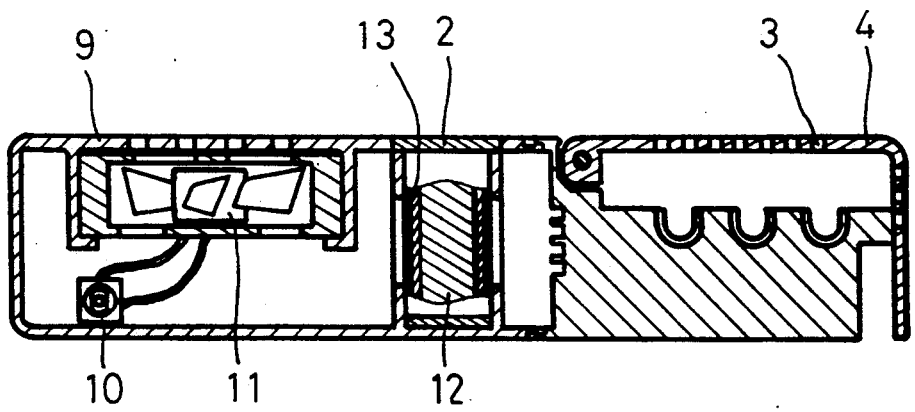
FIG. 3 is a sectional view of the air cleaner of the present invention, showing the cover of the ashtray is closed.

FIG. 3 is a sectional view of the air cleaner of the present invention shown in FIG. 1. FIG. 4 is a sectional view of the air cleaner, showing that the cover 4 of the removable ashtray 5 is open. The removable ashtray 5 may be a well-known ashtray with a cigarette clipper 14 for clipping cigarette. The top plate of the cover 4 has a plurality of open holes 3 serving as an air inlet of the ashtray 5. So, when the fan 11 rotates, a current of air may blow from the open holes 3, open end of the cleaner housing to the air outlet 6 of the housing.

The disposable filter 1 includes a rectangular carton with a plurality of air holes on two side walls thereof, and the outermost layer of the filter is an active carbon layer 13. The filter I contains chemical catalyst 12 and perfume material therein. The filter may be a form of disposable filter pack, and may be sealed and pressed into form. When installation, the filter pack 1 is first inserted into the filter mounting frame 2, and then the filter mounting frame 2 together with the filter pack 1 is inserted into the open slot 7 of the cleaner housing 9. So, the air flow from the air inlet of the removable ashtray 5 to the air outlet 6 of the cleaner housing 9 may be filtered by the filter 1.

At usual time, this invention is used for refreshing air. At smoking, the ashtray is used with removal of its cover, with reference to FIG. 4. Smoke air is drawn in by the fan 11, and suspended particles are filtered by filtering substances in filter pack, and detrimental compounds in secondhand smoke are decomposed by the catalytic action of chemicals, and deodorizing and refreshing air is produced.

At the same time, the perfume material contained in the filter 1 may be blown by the fan 11 and spreads into air, producing a fragrant environment.

When the ashtray is full, it would be removed from the cleaner housing for emptying of ash and cleaning. Used and expired filter pack may be disposed and replaced with new one by pulling the filter frame 2 out.

The present invention is apparent from the above detailed description. Many changes and modifications in the above described embodiment-of the invention may be carried out without departing from the scope of the following appended claims.

I claim:

1. An air cleaner with a build-in ashtray for refreshing air, comprising:

a cleaner housing having an open end and an air outlet, said open end being provided with a surrounding U-shaped slot thereon;

a fan mounted under the air outlet of the cleaner housing for blowing an air flow from said open end to the air outlet of the cleaner housing;

a removable ashtray mounted on the open end of the cleaner housing, the removable ashtray having two L-shaped wings for hooking the U-shaped slot of the open end of the cleaner housing and being removable from the cleaner housing;

an ashtray cover for covering the removable ashtray, the cover being provided with open holes acting as an air inlet; and a filter means mounted between the removable ashtray and the cleaner housing for filtering the air flow from the open end of the cleaner housing to the air outlet of the cleaner housing.

2. The air cleaner as claimed in claim 1, wherein the cleaner housing is further provided with an open slot formed thereon between the removable ashtray and the cleaner housing, and the filter means is inserted into the open slot and is disposable from the open slot of the cleaner housing.

3. The air cleaner as claimed in claim 1, wherein the filter means comprises a rectangular carton with a plurality of air holes formed on each side wall of the carton, the filter means containing chemical catalyst and, perfume therein and an active carbon layer.

* * * * *